US007318366B2

(12) United States Patent
Lee et al.

(10) Patent No.: US 7,318,366 B2
(45) Date of Patent: Jan. 15, 2008

(54) LOCKING FLEX-HEAD RATCHET WRENCH

(75) Inventors: Pei Yang Lee, Dallas, TX (US); Antonio De La Torre, Garland, TX (US)

(73) Assignee: Easco Hand Tools, Inc., Simsbury, CT (US)

( * ) Notice: Subject to any disclaimer, the term of this patent is extended or adjusted under 35 U.S.C. 154(b) by 0 days.

(21) Appl. No.: 11/365,348

(22) Filed: Mar. 1, 2006

(65) Prior Publication Data

US 2007/0204727 A1 Sep. 6, 2007

(51) Int. Cl.

| | |
|---|---|
| ***B25B 23/16*** | (2006.01) |
| *F16C 11/00* | (2006.01) |
| *F16D 1/12* | (2006.01) |
| *F16D 3/00* | (2006.01) |

(52) U.S. Cl. .................. 81/177.9; 81/177.7; 81/177.8; 403/93

(58) Field of Classification Search ............... 81/177.9, 81/177.7, 177.8, 489; 403/93, 92, 98
See application file for complete search history.

(56) References Cited

U.S. PATENT DOCUMENTS

| | | | | |
|---|---|---|---|---|
| 1,155,937 A | | 10/1915 | Lerfald | |
| 1,286,506 A | | 12/1918 | Beery | |
| 4,581,959 A | | 4/1986 | Troiano | |
| 4,711,145 A | * | 12/1987 | Inoue | 81/177.1 |
| 4,901,608 A | * | 2/1990 | Shieh | 81/177.8 |
| 5,199,335 A | * | 4/1993 | Arnold et al. | 81/177.8 |
| 5,768,960 A | | 6/1998 | Archuleta | |
| 6,000,302 A | * | 12/1999 | Chiang | 81/177.8 |
| 6,186,034 B1 | | 2/2001 | Lamons | |
| 6,216,567 B1 | * | 4/2001 | Hu | 81/177.9 |
| 6,220,125 B1 | * | 4/2001 | Lan | 81/177.9 |
| 6,295,898 B1 | | 10/2001 | Hsieh | |
| 6,324,947 B2 | | 12/2001 | Jarvis | |
| 6,382,058 B1 | | 5/2002 | Owoc | |
| 6,386,075 B1 | | 5/2002 | Shiao | |
| 6,405,621 B1 | | 6/2002 | Krivec et al. | |
| 6,745,650 B1 | | 6/2004 | Chang | |
| 6,857,341 B1 | * | 2/2005 | Cheng | 81/177.8 |
| 6,871,569 B1 | | 3/2005 | Chen | |
| 6,886,429 B1 | | 5/2005 | Lee | |
| 6,895,839 B1 | | 5/2005 | Hsien | |
| 7,000,507 B1 | * | 2/2006 | Lin | 81/177.9 |
| 7,036,403 B2 | * | 5/2006 | Lin | 81/177.8 |
| 7,051,625 B1 | * | 5/2006 | Lee | 81/177.8 |
| 2005/0274234 A1 | | 12/2005 | Lee | |

* cited by examiner

*Primary Examiner*—Alvin J. Grant
(74) *Attorney, Agent, or Firm*—Nelson Mullins Riley & Scarborough, LLP

(57) ABSTRACT

A ratcheting tool including a handle formed with an integral yoke at a first end and a tool head coupled to the yoke at a pivot. The tool head has a toothed hub facing rearwardly of the pivot and into the yoke. A locking spool is rotatably carried in the yoke adjacent the toothed hub. The locking spool has a first face, a second face, and a first tooth extending along both the first face and the second face and engaging the toothed hub. The locking spool is rotatable between a first position in which the first face is adjacent the toothed hub, thereby locking the tool head in a selected angular position with respect to the handle, and a second position in which the second face is adjacent the toothed hub such that the tool head is pivotable about the pivot.

28 Claims, 5 Drawing Sheets

LOCKING FLEX-HEAD RATCHET WRENCH

FIELD OF THE INVENTION

The present invention relates generally to ratchet wrenches. More particularly, the present invention relates to a ratchet wrench including a locking flex-head having a ratcheting feature.

BACKGROUND OF THE INVENTION

Wrenches having heads that pivot with respect to the wrench's handle axis ("flex-head" wrenches) for adjusting fasteners in hard to reach locations are well known. Existing flex-head .wrenches include a fastener-engaging head portion that is attached to a handle at a pivot joint so that a user may adjust the angular position of the head portion relative to the handle. As well, flex-head wrenches may include locking mechanisms for securing the head portion in the desired position relative to the handle during use. Often, these flex-head wrenches are not adequately suited for adjusting the angle of the head portion relative to the handle with only one hand. More specifically, when the locking mechanism is disengaged from the head portion to allow for adjustment, the head portion pivots freely about the handle. As such, a user must grasp the head portion with one hand for positioning while operating the locking mechanism with the remaining hand. Also, in flex-head wrenches that do not have locking mechanisms, it is not uncommon for the head portion to pivot unexpectedly relative to the handle when torque is applied to a fastener.

SUMMARY OF THE INVENTION

The present invention recognizes and addresses considerations of prior art constructions and methods. In one embodiment of the present invention, a ratcheting tool includes a handle formed with an integral yoke at a first end and a tool head coupled to the yoke at a pivot. The tool head has a toothed hub facing rearwardly of the pivot and into the yoke. A locking spool is rotatably carried in the yoke adjacent the toothed hub. The locking spool has a first face, a second face, and a first tooth extending along both the first face and the second face and engaging the toothed hub. The locking spool is rotatable between a first position in which the first face is adjacent the toothed hub, thereby locking the tool head in a selected angular position with respect to the handle, and a second position in which the second face is adjacent the toothed hub such that the tool head is pivotable about the pivot.

In another embodiment, a locking flex-head tool includes a handle formed with an integral yoke at a first end and a tool head including a toothed hub. The tool head is pivotally connected to the yoke at a pivot such that the toothed hub faces rearwardly into the yoke. A locking spool is rotatably carried in the yoke and is rotatable between a first position and a second position. The locking spool includes a first tooth configured to engage the toothed hub in both the first and the second positions. The tool head is fixed in a desired angular position relative to the handle when the locking spool is in the first position and the tool head is pivotable relative to the handle when the locking spool is in the second position.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which.

Figure 1:
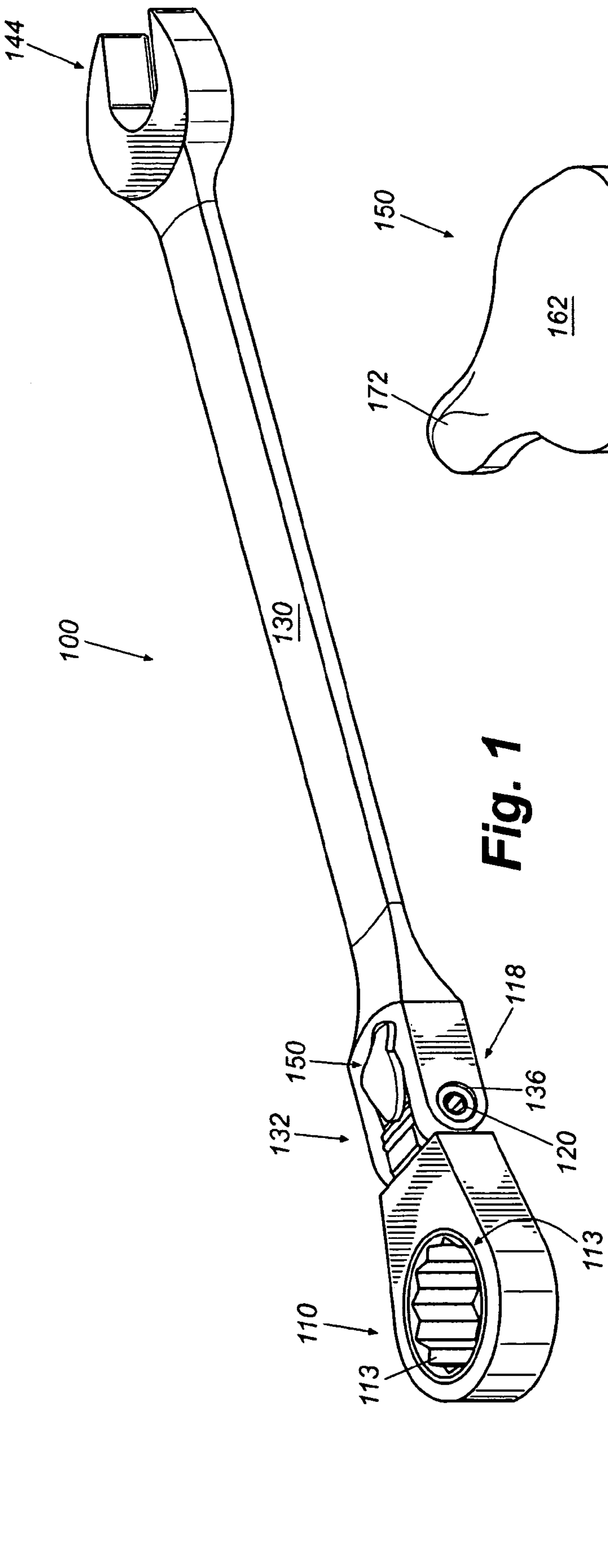
FIG. 1 is a perspective view of a locking flex-head ratchet wrench in accordance with an embodiment of the present disclosure.

Repeat use of reference characters in the present specification and drawings is intended to represent same or analogous features or elements of the invention according to the disclosure.

DETAILED DESCRIPTION OF THE PREFERRED EMBODIMENTS

Reference will now be made in detail to presently preferred embodiments of the invention, one or more examples of which are illustrated in the accompanying drawings. Each example is provided by way of explanation, not limitation, of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 2:
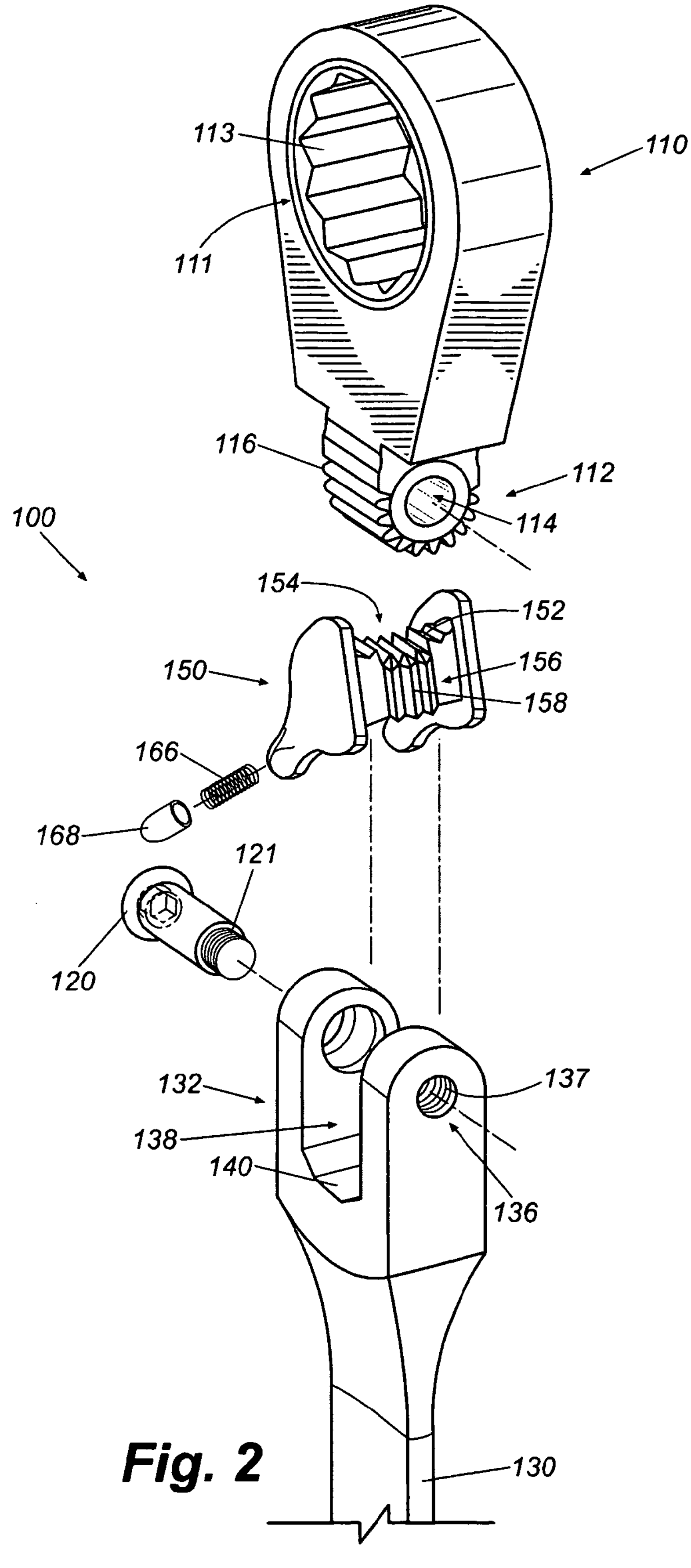
FIG. 2 is an exploded partial perspective view of the ratchet wrench shown in FIG. 1.

Referring to FIGS. 1 and 2, a locking flex-head wrench 100 in accordance with the present invention includes a tool head 110 pivotally mounted to a handle 130 such that the angle of tool head 110 relative to the axis of handle 130 may be selectively altered. Tool head 110 includes a rearwardly-facing annular hub 112 with a through-bore 114 formed therein and a plurality of transverse teeth 116 formed on the outer surface thereof. A ratchet ring 111 is rotatably received in tool head 110 and includes an inner engaging surface 113 for engaging variously shaped fasteners, tools, etc. A ratcheting mechanism (not shown) is disposed within tool head 110 and engages an outer surface of ratchet ring 111. Embodiments of such ratchet mechanisms are disclosed in U.S. Pat. No. 5,636,557, to Ma, issued Jun. 10, 1997, the entire disclosure being incorporated by reference herein.

A yoke 132 is formed by a pair of parallel legs extending from an end of handle 130. Yoke 132 forms a recessed portion 138 having a rear bearing surface 140. A through-bore 136 is formed through an outermost end of yoke 132 so that yoke through-bore 136 aligns with tool head through-bore 114 when annular hub 112 of tool head 110 is positioned between the legs of yoke 132. A pivot pin 120 is received in through-bores 114 and 136 to pivotally secure tool head 110 to handle 130. Pivot pin 120 includes a threaded end 121 that engages a threaded portion 137 of yoke through-bore 136 to secure the pivot pin therein. Preferably, wrench 100 includes a standard open wrench head 144 on the end of handle 130 opposite yoke 132. However, other embodiments can include a box wrench head, a ratcheting box wrench head, another locking flex-head, etc.

Figure 3:
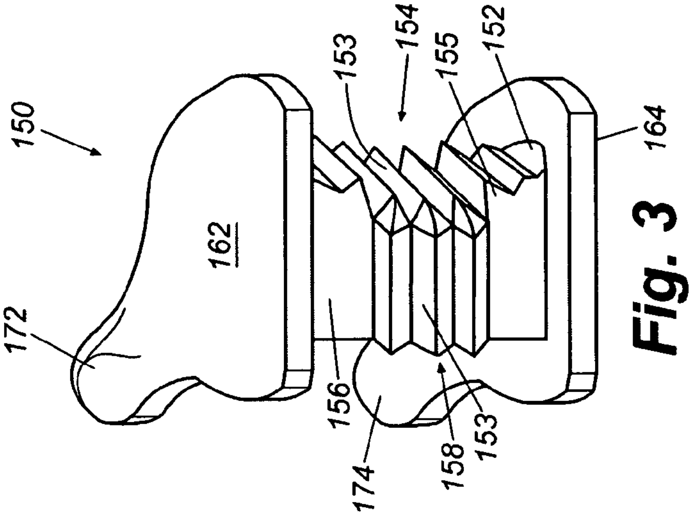
FIG. 3 is a perspective view of a locking spool of the ratchet wrench shown in FIG. 1.

A locking spool 150 is carried within handle 130 aft of the pivot joint that connects tool head 110 to handle 130. Locking spool 150 may be rotated to a first position in which tool head 110 is locked in position with respect to handle 130 or to a second position in which tool head 110 may be pivoted relative to handle 130. As best seen in FIG. 3, locking spool 150 includes a central portion having a locking surface 152 with a set of locking teeth 154, a ratcheting surface 156 with a set of ratcheting teeth 158, and a curved rear wall (FIG. 4A) with a blind bore 170 formed therein. Preferably, at least a first tooth 153 extends continuously along both locking surface 152 and ratcheting surface 156 and is common to both sets of locking teeth 154 and ratcheting teeth 158. In other embodiments, the first tooth may include two independent, yet axially aligned portions which extend along locking surface 152 and ratcheting surface 156, respectively. In the preferred embodiment shown, the set of locking teeth 154 further includes at least a second tooth 155 that is not shared in common with the set of ratcheting teeth 158. A spring 166 and a detent 168 are received in bore 170 so that detent 168 extends outwardly therefrom. The central portion of locking spool 150 extends between an upper flange 162 and a lower flange 164, each flange including a lever 172 and 174, respectively, for manipulating locking spool 150.

Figure 4A:
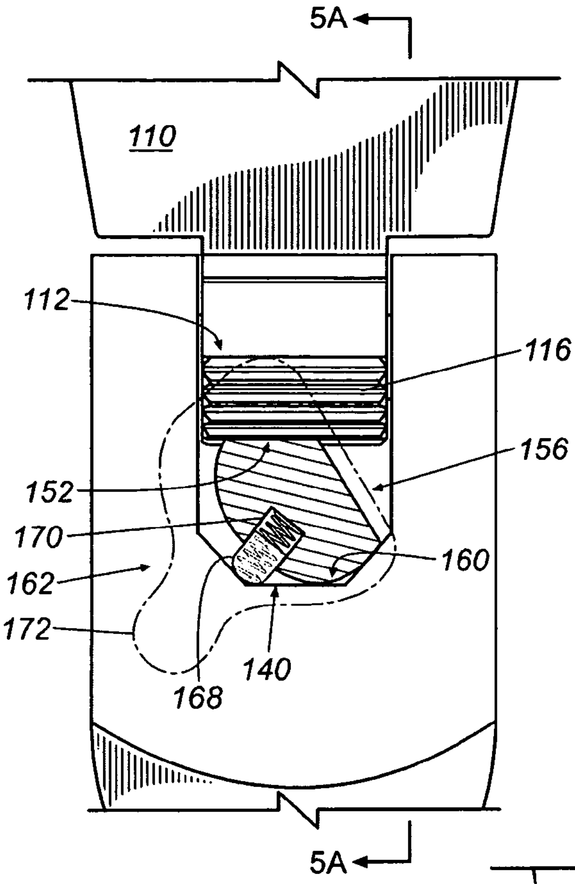
FIGS. 4A and 4B are partial top views of the ratchet wrench shown in FIG. 1 in the locked and unlocked positions, respectively.
Figure 4B:
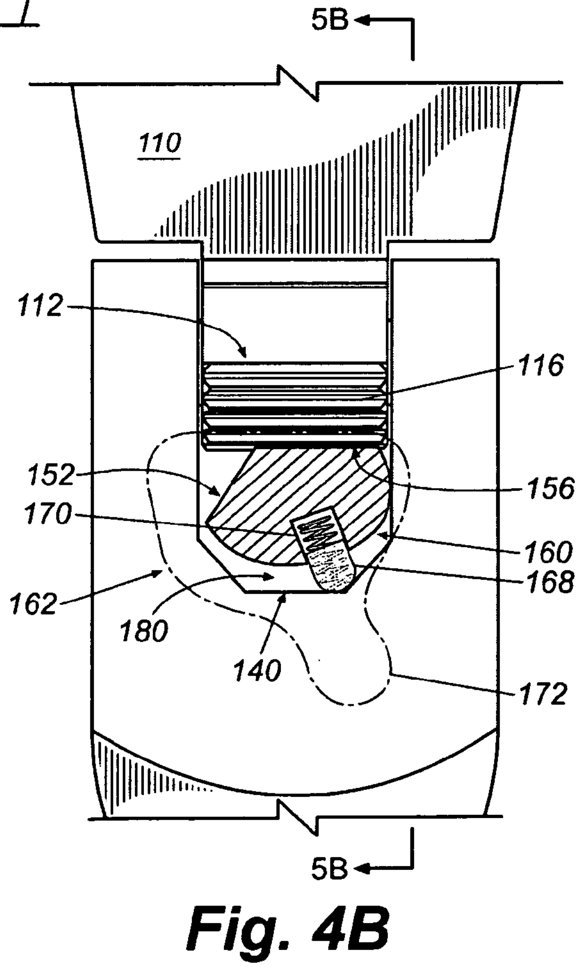

When assembled, locking spool 150 is carried in yoke 132 of handle 130 such that upper and lower flanges 162 and 164 abut opposing sides of handle 130. Upper and lower flanges 162 and 164 prevent motion of locking spool 150 in a direction transverse to the longitudinal axis of handle 130. As shown in FIGS. 4A and 4B, locking spool 150 is pivotal between a first position in which locking surface 152 is adjacent annular hub 112 and a second position in which ratcheting surface 156 is adjacent annular hub 112. In the first position, locking teeth 154 engage transverse teeth 116 and in the second position ratcheting teeth 158 engaged transverse teeth 116. In either position, detent 168 is urged rearwardly by spring 166 and continuously engages rear bearing surface 140 of yoke 132. Spring 166 imparts a biasing force through detent 168 which urges locking spool 150 forwardly and into constant contact with transverse teeth 116 of annular hub 112.

As shown in FIG. 4A, the central portion of locking spool 150 is dimensioned such that when the spool is in the first position its fore and aft dimension relative to the longitudinal axis of handle 130 causes locking spool 150 to be "wedged" between rear bearing surface 140 and annular hub 112. As shown in FIG. 4B, when locking spool 150 is in the second position the fore and aft dimension of the central portion is less than the distance between rear bearing surface 140 and the rear surface of annular hub 112. However, the previously noted biasing force provided by spring 166 through detent 168 urges locking spool 150 forward and into constant contact with annular hub 112 so that a gap 180 exists between rear bearing surface 140 of handle 130 and rear wall 160 of locking spool 150.

Figure 5A:
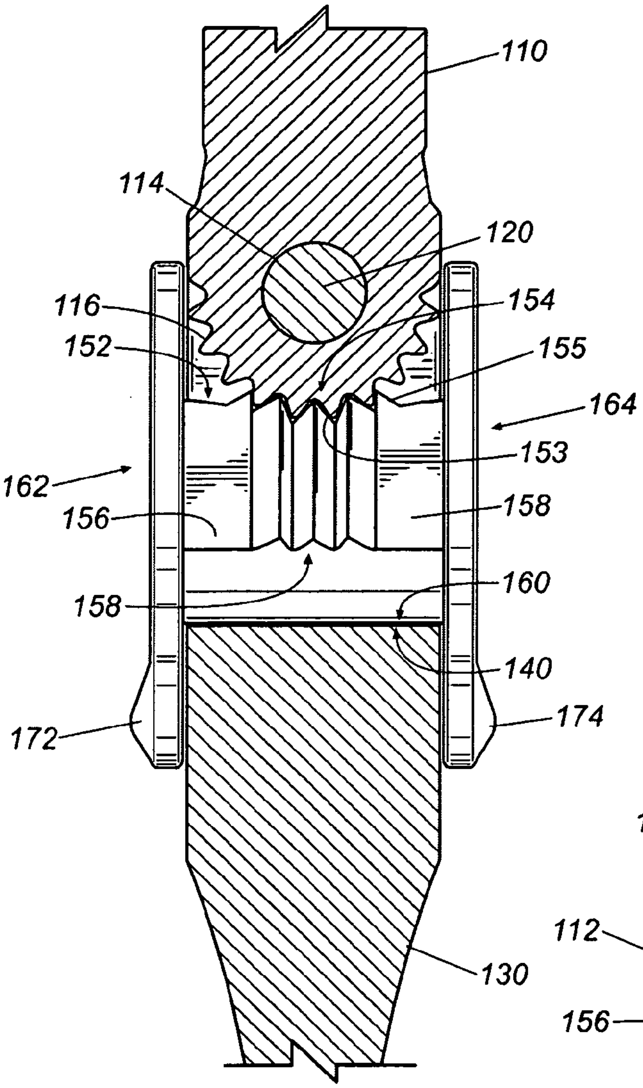
FIGS. 5A and 5B are partial cut-away side views of the ratchet wrench shown in FIGS. 4A and 4B, respectively, taken along lines 5A-5A and 5B-5B.
Figure 5B:
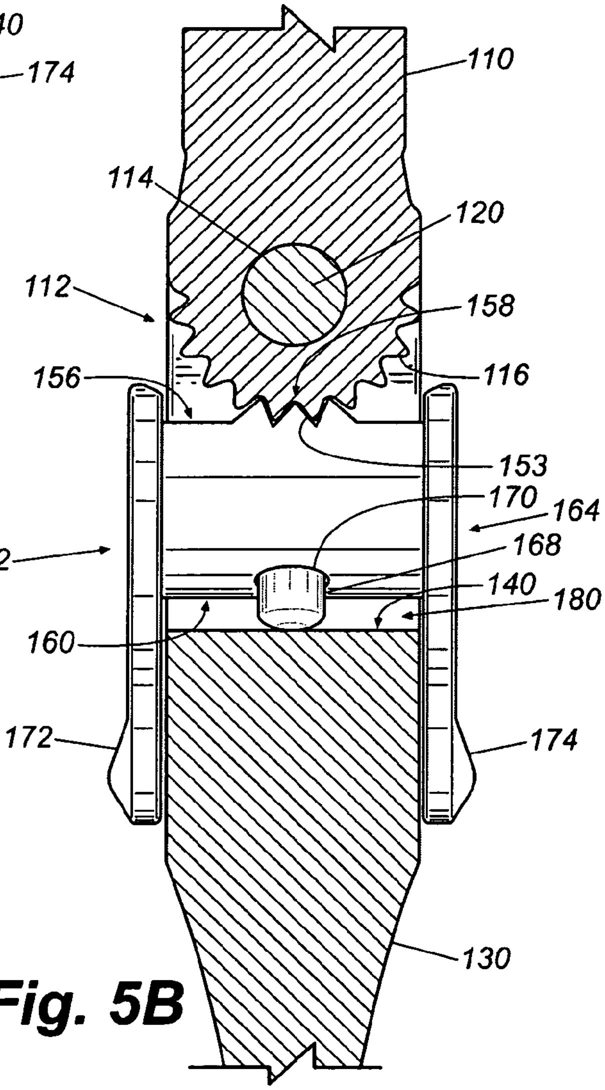

To adjust the angle of tool head 110 relative to handle 130, a user first repositions locking spool 150 from the first position shown in FIGS. 4A and 5A to the second position shown in FIGS. 4B and 5B. As best seen in FIG. 5A, in the first position, locking teeth 154 engage transverse teeth 116 on annular hub 112 and a portion of curved rear wall 160 is in contact with rear bearing surface 140 of handle 130. Fore and aft motion of locking spool 150 along the longitudinal axis of handle 130 is prevented so that the engagement between locking teeth 154 and transverse teeth 116 prevents pivotal motion of tool head 110 relative to the axis of handle 130. To unlock tool head 110, the user rotates locking spool 150 with lever 172 (or lever 174) so that locking surface 152, and therefore locking teeth 154, are pivoted away from annular hub 112 and ratcheting surface 156 is pivoted toward annular hub 112 (FIGS. 4B and 5B). When locking spool 150 is in the second position, ratcheting surface 156 is adjacent annular hub 112, and ratcheting teeth 158 engage transverse teeth 116. Biasing force provided by spring 166 through detent 168 insures that ratcheting teeth 158 are continuously biased toward engagement with transverse teeth 116, although locking spool 150 is now capable of fore and aft motion along handle 130 due to the dimensions of locking spool 150.

In the second position, a gap 180 exists between rear bearing surface 140 of handle 130 and rear wall 160 of locking spool 150. When repositioning locking spool 150 from the first position to the second position, or vice versa, the biasing force provided by spring 166 and detent 168 maintains locking spool 150 adjacent annular hub 112 so that either locking teeth 154 or ratcheting teeth 158 constantly engage transverse teeth 116. Therefore, tool head 110 remains in its initial angular position relative to handle 130 during manipulation of locking spool 150. As well, because at least first tooth 153 is common to both sets of locking and ratcheting teeth 154 and 158, respectively, at least first tooth 153 continuously engages transverse teeth 116 of annular hub, thereby preventing pivotal motion of tool head 110 relative to handle 130. The continual engagement of first tooth 153 with transverse teeth 116 insures that both locking teeth and ratcheting teeth 158 remain properly aligned with transverse teeth 116 when repositioning locking spool 150. As noted, other embodiments include a first tooth having two separate yet axially-aligned portions. Preferably, the gap between the two tooth portions is sized such that prior to one tooth portion disengaging transverse teeth 116, the second tooth portion engages the transverse teeth so that pivotal motion of tool head 110 relative to handle 130 is prevented.

To adjust the angular position of tool head 110 relative to handle 130 after locking spool 150 has been placed in the second position, the user exerts pivotal force on tool head 110 until the force exerted on ratcheting teeth 158 by transverse teeth 116 along the longitudinal axis of handle 130 is enough to overcome the forward biasing force provided by spring 166 and detent 168 on unlocking spool 150. As the rearward force exerted by transverse teeth 116 overcomes the forward biasing force, locking spool 150 is urged rearwardly so that spring 166 is compressed and detent 168 retracts inside bore 170. As locking spool 150 moves rearwardly, gap 180 narrows and transverse teeth 116 "override" ratcheting teeth 158. Upon reaching the desired angular position of tool head 110 relative to handle 130, a user ceases exerting pivotal force on tool head 110 and spring 166 and detent 168 urge locking spool 150 forwardly so that ratchet teeth 158 securely engage transverse teeth 116, thereby maintaining tool head 110 and the desired angular position.

Figure 6:
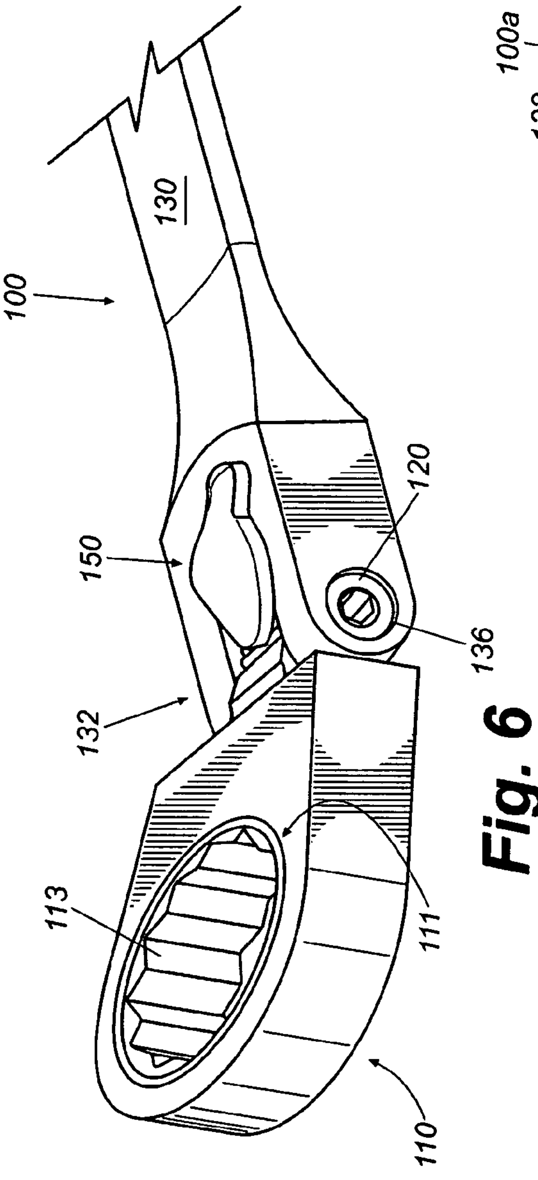
FIG. 6 is a partial perspective view of the ratchet wrench shown in FIG. 1 with the tool head locked in a desired position.

To secure tool head 110 in the new position relative to handle 130 (FIG. 6), a user returns locking spool 150 to the first position previously discussed with regard to FIGS. 4A and 5A. As best seen in FIG. 5A, in the preferred embodiment, the set of locking teeth 154 includes teeth 155 in addition to those teeth which may be common to both sets of locking and ratcheting teeth 154 and 158, respectively. These additional teeth 155 engage transverse teeth 116 for additional strength in the locked position.

As discussed, when manipulating locking spool 150 either the locking teeth 154 or ratcheting teeth 158, and at least first tooth 153 which is common to both, continuously engage transverse teeth 116 of annular hub 112. Therefore, when repositioning locking spool 150, it is not necessary for a user to hold tool head 110 to prevent tool head from pivoting freely relative to handle 130. Simply put, the entire operation of repositioning tool head 110 from a first angular position to a second angular position relative to handle 130 may be accomplished by one hand.

Figure 7:
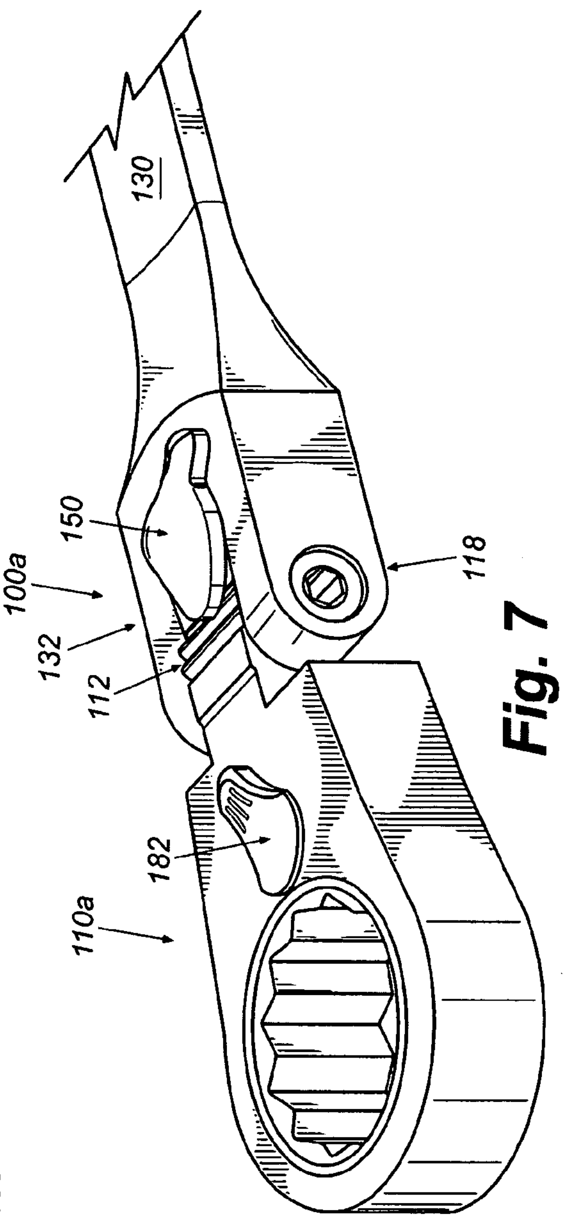
FIG. 7 is a partial perspective view of an embodiment of the present invention where the ratchet wrench includes a selectively reversible ratcheting mechanism.

Referring now to FIG. 7, an alternate embodiment of a flex-head wrench **100*a* is shown in accordance with the present invention. Tool head 110*a* is constructed similarly to tool head 110 shown in FIGS. 1 and 2, with the exception that the ratcheting mechanism (not shown) disposed within head portion 110*a* is selectively reversible by manipulating a ratchet lever 182. Manipulation of ratchet lever 182 allows the user to select the direction of rotation of wrench 100*a*** that causes torque to be transmitted to a fastener. Embodiments of such ratchet mechanisms are disclosed in U.S. Pat. No. 6,918,323, to Arnold, et al., issued Jul. 19, 2005, the entire disclosure being incorporated by reference herein.

While one or more preferred embodiments of the invention are described above, it should be appreciated by those skilled in the art that various modifications and variations can be made in the present invention without departing from the scope and spirit thereof. For example, the locking flex-head feature can be used with non-ratcheting wrenches. As well, the cross-sectional shapes and number of teeth formed on the locking spool and hub can vary. It is intended that the present invention cover such modifications and variations as come within the scope and spirit of the appended claims and their equivalents.

The invention claimed is:

1. A ratcheting tool comprising:

a handle formed with an integral yoke at a first end;

a tool head coupled to said yoke at a pivot, said tool head having a toothed hub facing rearwardly of said pivot and into said yoke;

a locking spool rotatably carried in said yoke adjacent said toothed hub, said locking spool having a first face, a second face, and a first tooth extending along both said first face and said second face; and wherein said locking spool is rotatable between a first position in which said first face is adjacent said toothed hub, thereby locking said tool head in a selected angular position with respect to said handle, and a second position in which said second face is adjacent said toothed hub such that said tool head is pivotable about said pivot, said first tooth engaging said toothed hub in both said first position and said second position.

2. The ratcheting tool according to claim 1, wherein said first face is contiguous to said second face.

3. The ratcheting tool according to claim 1, wherein an axis of rotation of said locking spool is orthogonal to a longitudinal axis of said handle.

4. The ratcheting tool according to claim 1, said first face further comprising a second tooth, said second tooth engaging said toothed hub when said locking spool is in said first position.

5. The ratcheting tool according to claim 1, further comprising a detent disposed between a backside of said locking spool and a back wall of said yoke, wherein when said locking spool is in said second position said detent urges said second face of said locking spool into contact with said toothed hub and allows motion of said locking spool along a longitudinal axis of said handle such that said first tooth overrides said toothed hub as said tool head is rotated about said pivot.

6. The ratcheting tool according to claim 1, further comprising a detent disposed between a backside of said locking spool and a back wall of said yoke, said detent configured to allow motion of said locking spool along a longitudinal axis of said handle when said locking spool is in said second position.

7. The ratcheting tool according to claim 6, further comprising a blind bore formed in said backside of said locking spool, said detent depending outwardly therefrom.

8. The ratcheting tool according to claim 6, wherein said locking spool is wedged between said toothed hub and said back wall of said yoke when said locking spool is in said first position.

9. The ratcheting tool according to claim 1, wherein said locking spool further comprises a first plurality of teeth on said first face, a second plurality of teeth on said second face, and said first tooth is common to both said first and said second pluralities of teeth.

10. The ratcheting tool according to claim 1, said locking spool further including a first adjustment lever extending therefrom along a top surface of said handle and a second adjustment lever extending therefrom along a bottom surface of said handle.

11. The ratcheting tool according to claim 1, further comprising a wrench head formed at a second end of said handle.

12. The ratcheting tool of claim 1, wherein said tool head further comprises a selectively reversible ratcheting wrench head.

13. A locking flex-head tool comprising:

a handle formed with an integral yoke at a first end;

a tool head including a toothed hub, said tool head pivotally connected to said yoke at a pivot such that said toothed hub faces rearwardly into said yoke;

a locking spool rotatably carried in said yoke, said locking spool being rotatable between a first position and a second position, said locking spool including a first tooth configured to engage said toothed hub in both said first and said second positions; and wherein said tool head is fixed in a desired angular position relative to said handle when said locking spool is in said first position and said tool head is pivotable relative to said handle when said locking spool is in said second position.

14. The locking flex-head tool according to claim 13, further comprising a second tooth configured to engage said toothed hub when said locking spool is in said first position.

15. The locking flex-head tool according to claim 13, wherein an axis of rotation of said locking spool is orthogonal to a longitudinal axis of said handle.

16. The locking flex-head tool of claim 13, wherein said locking spool is movable along a longitudinal axis of said handle when said locking spool is in said second position.

17. The locking flex-head wrench according to claim 16, wherein said locking spool is in said first position said locking spool contacts said toothed hub and an inner wall of said yoke such that movement of said locking spool along said longitudinal axis of said handle is prevented.

18. The locking flex-head wrench of claim 16, further comprising a detent disposed between said locking spool and an inner surface of said yoke, said detent urging said locking spool into contact with said toothed hub.

19. The locking flex-head wrench of claim 18, wherein said detent is carried by said locking spool.

20. The locking flex-head wrench of claim 19, wherein said locking spool includes a blind bore and said detent is disposed in said blind bore.

21. The locking flex-head wrench according to claim 13, wherein said locking spool further comprises a first plurality of teeth and a second plurality of teeth, said first plurality of teeth engaging said toothed hub in said first position, said second plurality of teeth engaging said toothed hub in said second position, and said first tooth being common to both said first and second pluralities of teeth.

22. The locking flex-head wrench according to claim 13, wherein said tool head further comprises a ratcheting wrench head.

23. The locking flex-head tool according to claim 13, said locking spool further including a first lever and a second lever extending therefrom on opposing surfaces of said handle.

24. The locking flex-head tool according to claim 23, further comprising a wrench head disposed at a second end of said handle.

25. A ratcheting tool comprising:

a handle with a bearing surface;

a tool head coupled to said handle at a pivot, said tool head having a toothed hub extending rearwardly of said pivot;

a locking spool rotatably carried between said handle and said tool head, said locking spool including a first face with a first tooth portion, a second face with a second tooth portion, said locking spool being rotatable between a first position and a second position; and wherein in said first position said first face opposes said toothed hub such that said first tooth portion engages said toothed hub and said locking spool is disposed in an axially-fixed position between said toothed hub and said bearing surface of said handle, thereby preventing said tool head from pivoting relative to said handle; and in said second position said second face opposes said toothed hub such that said second tooth portion engages said toothed hub and said locking spool is disposed in an axially-slidable position, such that pivoting said tool head relative to said handle causes said toothed hub to override said second tooth portion.

26. The ratcheting tool of claim 25, wherein said first tooth portion and said second tooth portion are adjoined and form a single first tooth.

27. The ratcheting tool of claim 25, wherein one of said first and second tooth portions engages said toothed hub prior to the other of said first and second toothed portions disengaging said toothed hub as said locking spool is rotated between said first and second positions.

28. The ratcheting tool of claim 25, further comprising a spring disposed between said handle and said locking spool, said spring biasing said locking spool toward said tool head.

* * * * *